United States Patent [19]

Uitz

[11] Patent Number: 5,573,599
[45] Date of Patent: Nov. 12, 1996

[54] METHOD OF CLEANING A REUSABLE COLLAPSIBLE CONTAINER

[76] Inventor: Mark O. Uitz, 1050 Crest View Dr., Mountain View, Calif. 94040

[21] Appl. No.: 440,527

[22] Filed: May 12, 1995

Related U.S. Application Data

[62] Division of Ser. No. 125,488, Sep. 23, 1993, Pat. No. 5,450,962.

[51] Int. Cl.⁶ ............................................. B08B 7/00
[52] U.S. Cl. ........................... 134/16; 134/25.1; 134/42
[58] Field of Search ........................... 134/16, 25.1, 42, 134/59

[56] References Cited

U.S. PATENT DOCUMENTS

| | | | |
|---|---|---|---|
| 3,060,943 | 10/1962 | Clayton | 134/16 X |
| 3,973,684 | 8/1976 | De Martino | 206/512 |
| 3,987,924 | 10/1976 | Uitz | 220/4 F |
| 4,366,905 | 1/1983 | Forshee | 220/4.33 |
| 4,599,131 | 7/1986 | Matuszak | 156/584 |
| 4,624,380 | 11/1986 | Wernette | 220/6 |
| 4,711,355 | 12/1987 | Veenman | 206/511 |
| 4,893,746 | 1/1990 | Swanhart et al. | 220/6 |
| 4,905,833 | 3/1990 | Kreeger et al. | 206/511 |
| 4,998,637 | 3/1991 | Marovskis | 220/4.33 |
| 5,073,203 | 12/1991 | Al-Ghatta | 134/42 |
| 5,123,533 | 6/1992 | Uitz | 206/386 |
| 5,255,859 | 10/1993 | Peacock et al. | 134/25.1 |
| 5,328,042 | 7/1994 | Heise | 220/648 |
| 5,335,814 | 8/1994 | Hepp | 206/511 |
| 5,443,652 | 8/1995 | Scarola et al. | 134/25.1 |

*Primary Examiner*—Jill Warden
*Assistant Examiner*—Saeed T. Chaudhry
*Attorney, Agent, or Firm*—Flehr, Hohbach, Test, Albritton & Herbert

[57] ABSTRACT

A reusable plastic container and a method of cleaning and sterilizing the same is described. The plastic container can be collapsed for transportation and sterilization when not in use. The container includes structural end frames which are made from the same material from which the remainder of the container is made. When collapsed, a container is flat and all parts of the same are exposed for easy washing and sterilization.

2 Claims, 5 Drawing Sheets

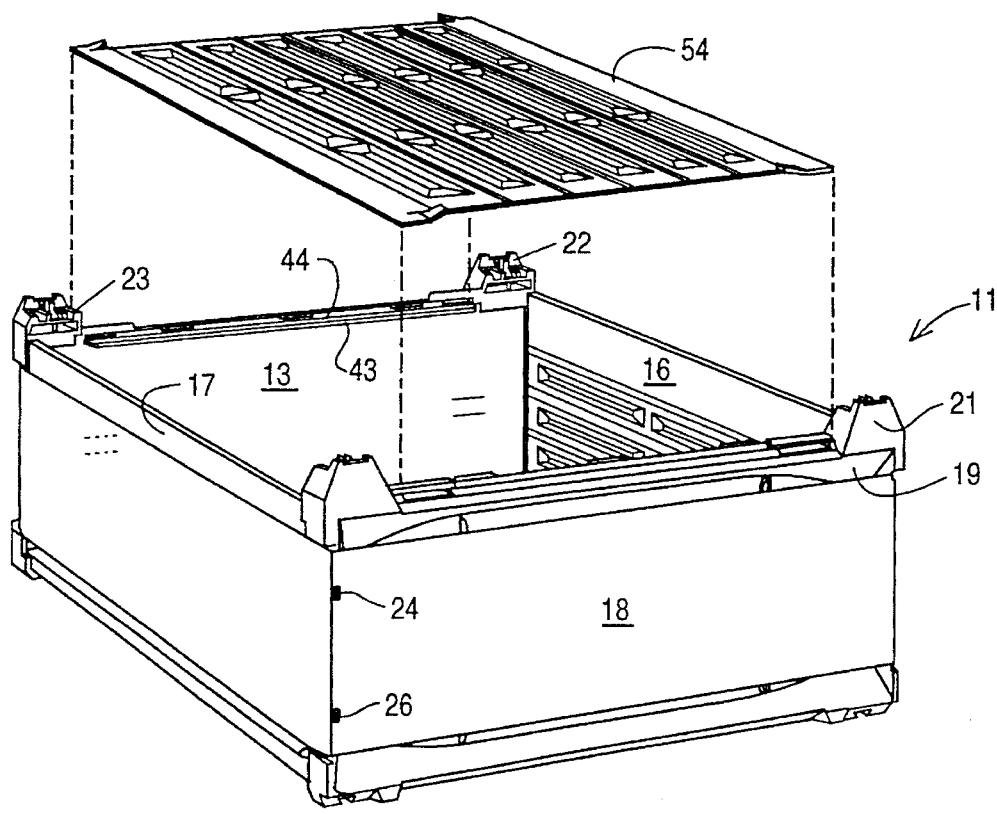
FIG_1
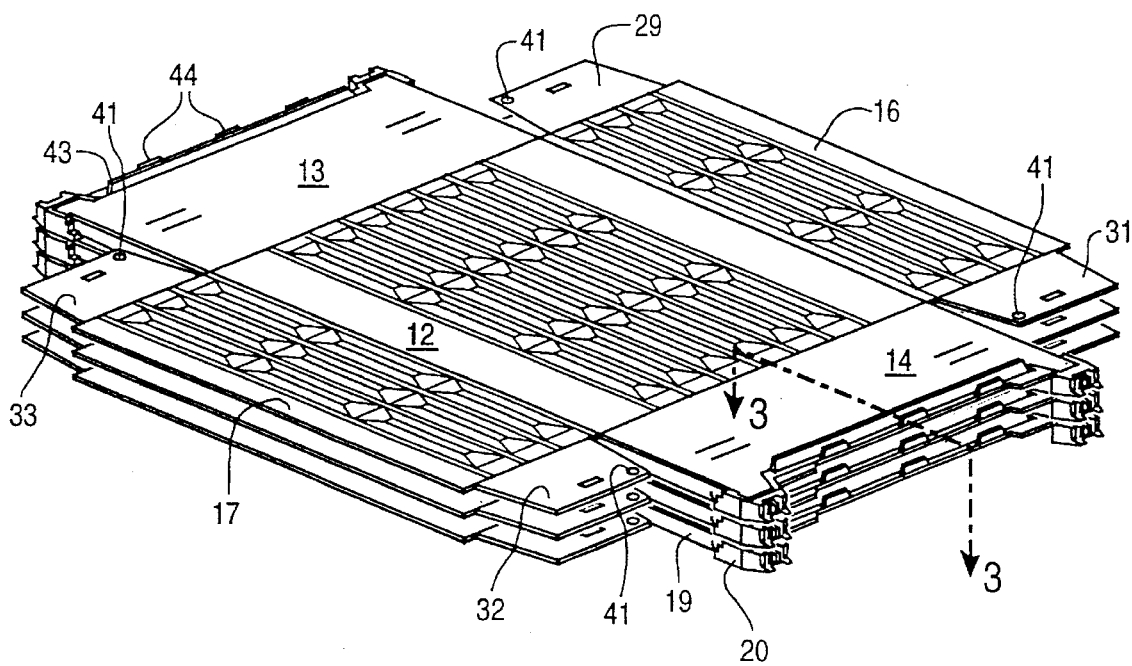
FIG_2

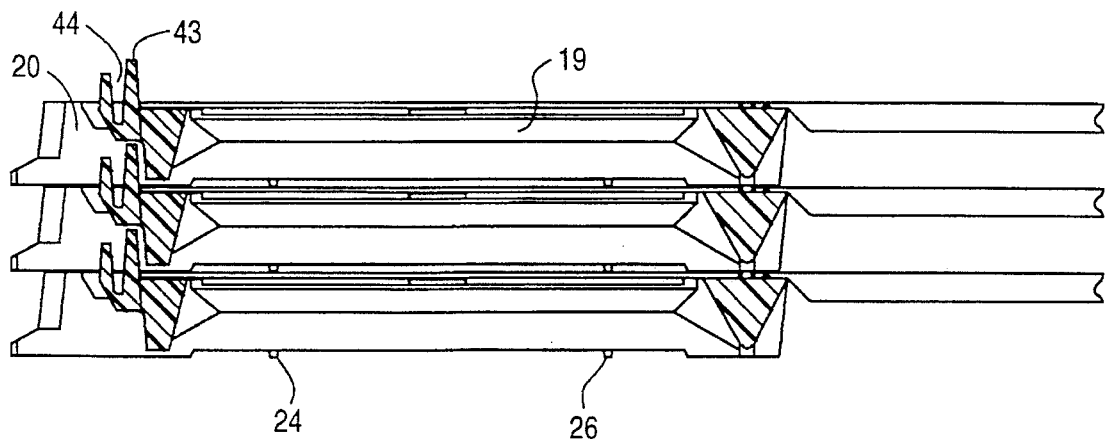
FIG_3
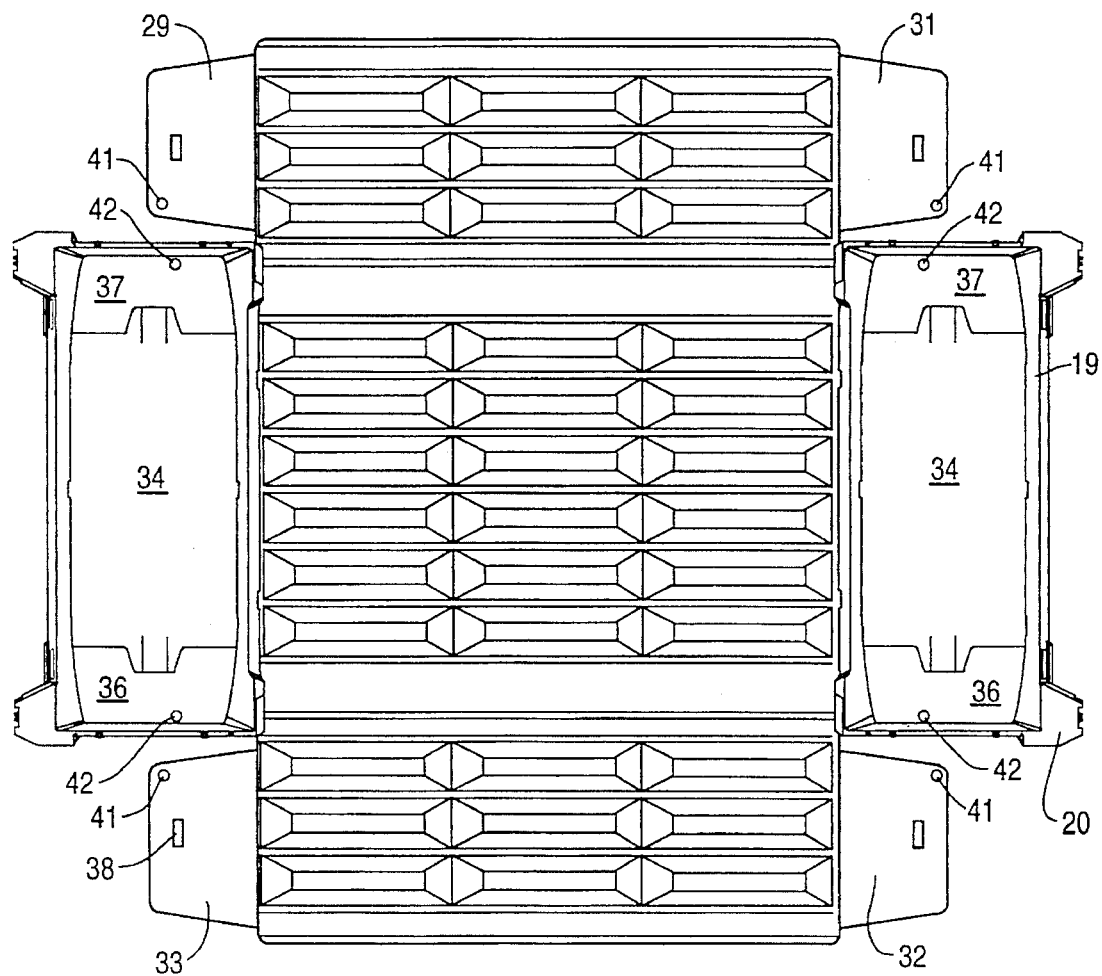
FIG_4

FIG_5
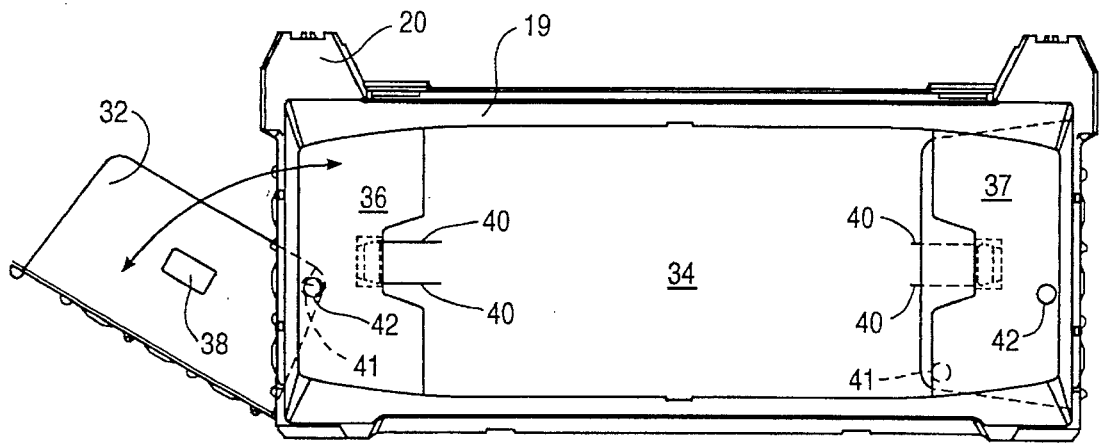
FIG_6A
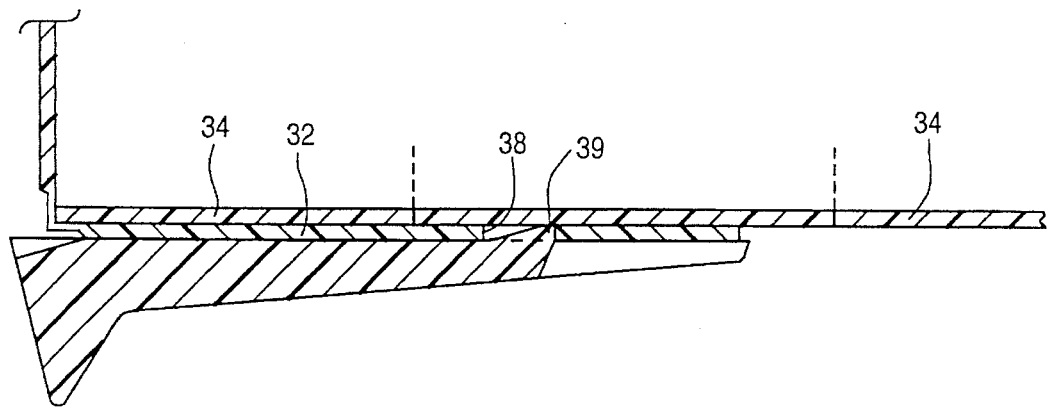
FIG_6B

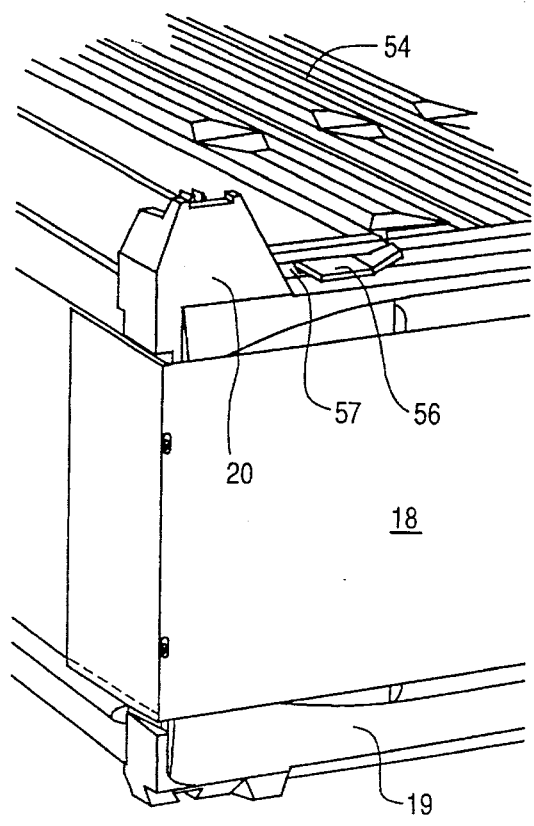
FIG_7
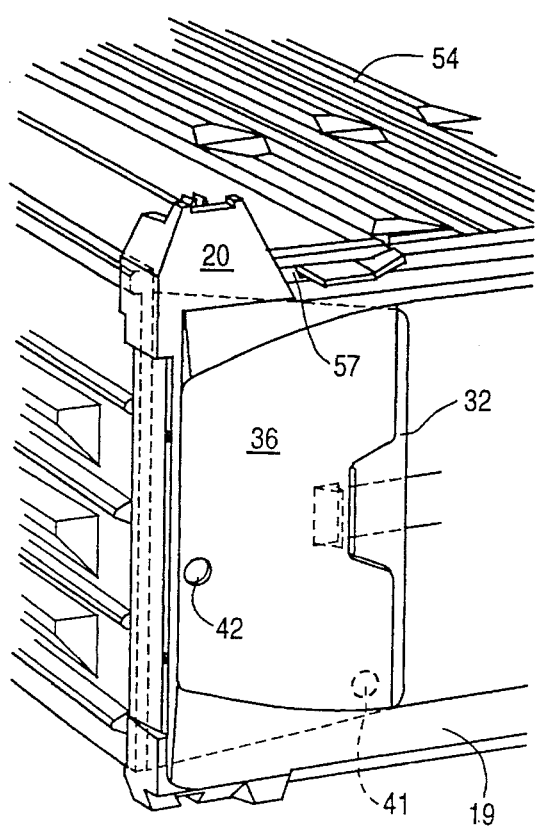
FIG_8
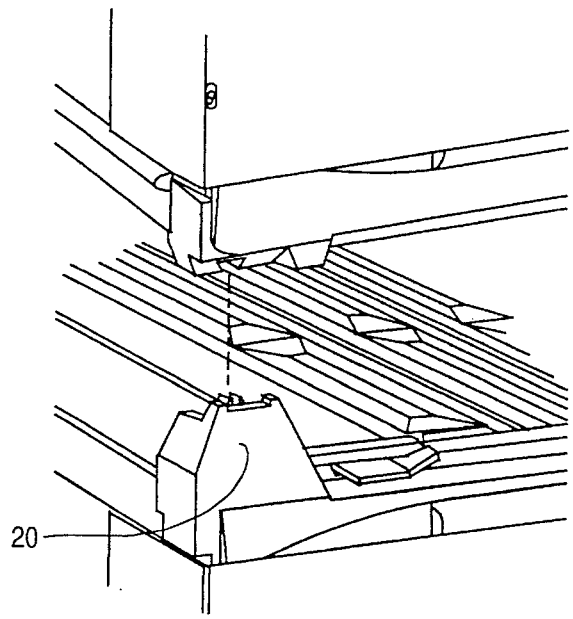
FIG_9

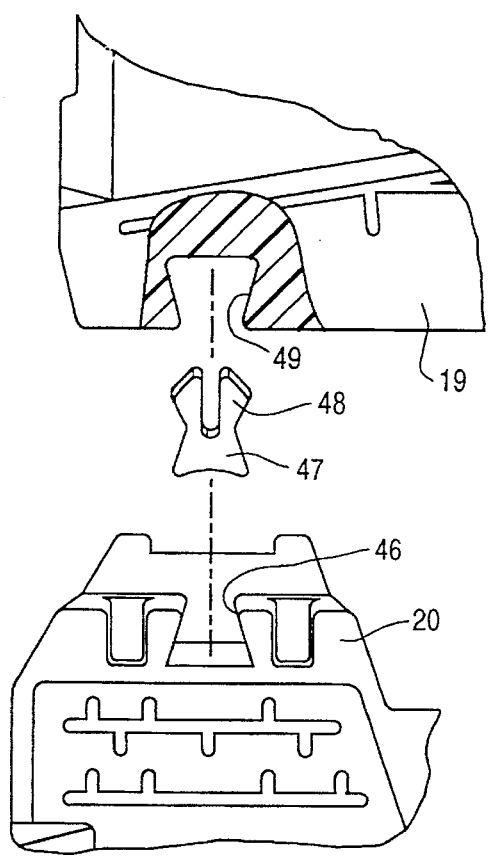
FIG_10A
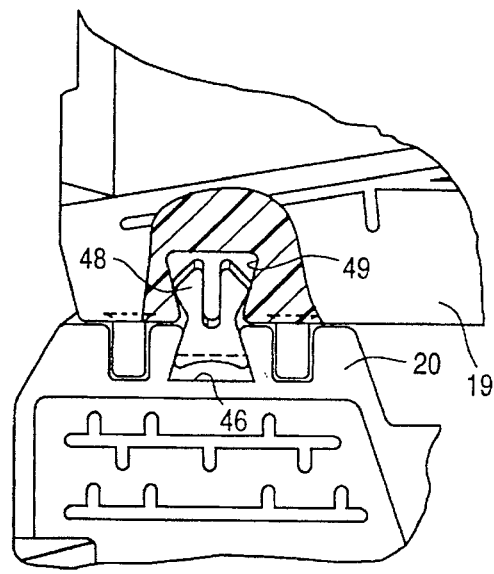
FIG_10B
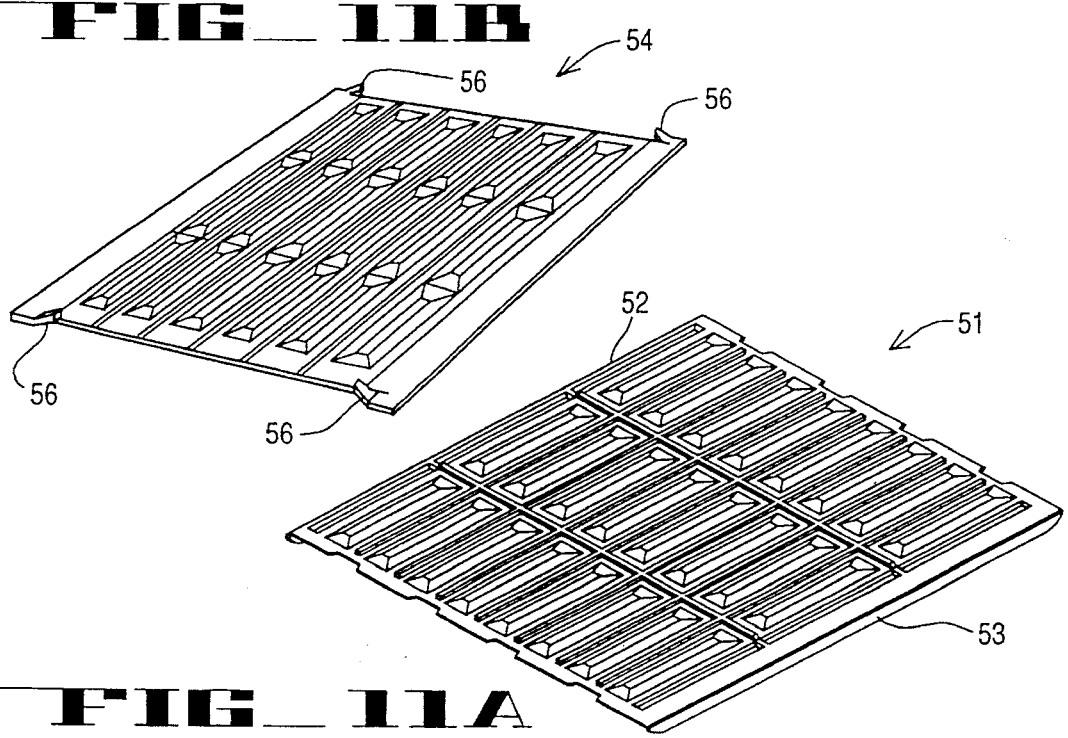
FIG_11B
FIG_11A

METHOD OF CLEANING A REUSABLE COLLAPSIBLE CONTAINER

This is a division of application Ser. No. 08/125,488 filed 09/23/93 New Pat. No. 5,450,962.

BACKGROUND OF THE INVENTION

The present invention relates to plastic containers and, more particularly, to a method of cleaning a reusable plastic container. While the container is designed for use with produce and other grown food products, by reason of its features it may also desirably be used to contain other commodities.

Many items of produce and other fresh food products are packed in the field in wooden crates for transportation to retail outlets. Typically crates of this nature are simply placed in the trash after this single use. This, of course, results in significant environmental problems. Such use not only represents a one-time use of a resource (the wood), it also results in a major waste disposal/land fill problem. Because of these and other problems many in the art have designed plastic containers and container systems. Some of these are made for recycling. Reference is made, for example, to applicant's U.S. Pat. Nos. 3,987,924 and 5,123,533. Patents and patent applications of the same or similar subject matter have also been filed and/or obtained in other countries.

SUMMARY OF THE INVENTION

The present invention relates to a method of cleaning a reusable plastic container. The plastic container is conventional in that it has a bottom wall with opposed edges from which four side wall structures, a pair of end walls, and a pair of side walls, extend. Means are provided on the wall structures defining a path for a band of material to secure such wall structures together to form a container cavity with the bottom wall. Most desirably, connecting structures in the form of complementary interlocking constructions on adjacent side edges of the walls also cooperate with such band path defining means for securing the wall structures together.

When the band of material is removed from the remainder of the structure, the walls can be placed in the same plane as the bottom wall—in other words, the container can go from an erect position to a fully collapsed (flat) position. In this connection, each of the wall structures is preferably connected to the bottom wall by a hinge made of plastic—most simply just a thin area of plastic.

It will be appreciated that after a container with this construction is used, for example, to transport a fresh food product, it can be collapsed so that the amount of storage it requires is minimized. In keeping with the broad aspects of the invention, then can be washed and sterilized for reuse while in a flattened condition. The ability to flatten the containers not only minimizes the amount of storage required to transport the same, but also facilitates washing and sterilizing, for reuse. Most desirably, the container is made of a plastic material which is not absorbent and therefore does not provide a good host for bacteria growth nor trap residual fumigant gases.

It has been found that a container of the above type can be reused many times before it must be disposed of. For example, in one implementation of the invention the container is devised to last through 60 reuses over a time span of ten years.

The invention includes a method of reuse in which the container is washed and sterilized between uses while it is in its flattened condition. It is a simple matter to use brushes and the like on the reusable container since when it is flattened all parts of the same generally are in the same plane.

The method of the invention and the reusable container have many other features. For example, the container includes connector structure which facilitates connection of vertically adjacent containers in a stack. Other features and advantages of the invention either will become apparent or will be described in connection with the following, more detailed description of a preferred embodiment of the invention.

BRIEF DESCRIPTION OF THE DRAWING

With reference to the accompanying five sheets of drawing:

FIG. 1 is an isometric view to which a preferred embodiment of a container of the invention is applicable in erect condition, and showing a lid to be described exploded therefrom;

FIG. 2 is an isometric view illustrating a multiple number of the containers of FIG. 1 in a flattened condition;

FIG. 3 is an enlarged partial sectional view taken on a plane indicated by the lines 3—3 in FIG. 2;

FIG. 4 is a plan view showing the container in a flattened condition, the side shown being the opposite of the side shown in FIG. 2;

FIG. 5 is a side elevation view of the container showing one side wall in a position permitting access to the interior of the container;

FIGS. 6A and 6B are enlarged sectional views showing interlocking constructions at the side edges of the walls of the container;

FIG. 7 is an isometric view illustrating a corner edge of the container;

FIG. 8 is a view similar to FIG. 7 but showing the corner edge without the band of material;

FIG. 9 is a partial isometric view illustrating how two containers which are vertically adjacent one another may be secured together;

FIGS. 10A and 10B are enlarged partial views providing a more detailed illustration of the manner in which two vertically adjacent containers may be secured together; and FIGS. 11A and 11B are isometric views of alternate lid structures which may be used with the container.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention.

With reference to the drawings, a preferred embodiment of the container is generally referred to by the reference numeral 11. It includes a bottom wall 12, a pair of end wall structures 13 and 14 and a pair of side wall structures 16 and 17. (It is to be noted the bottom wall and the side wall structures have extruded ribs formed when the shell providing the bottom and side walls is extruded. The shell is embossed to provide additional strength without adding weight or additional shell thickness.)

Each of the wall structures is connected to its associated bottom edge by a hinge which is made of plastic. In this connection, the whole structure (except for the structural end frames to be discussed) is made as a one-piece plastic part, preferably from polypropylene (PP), with appropriate hinges. That is, the plastic at the junctions between the walls and the bottom edges is made thinner so as to permit the walls to be moved between the two positions represented in FIGS. 1 and 2. It should be realized that the technique of making such hinges from plastic is quite advanced and hinges can be provided which can be cycled many times without adverse consequences.

A band of material 18 circumscribes the walls holding all of the same together to form a container cavity with the bottom wall. Printing or the like showing a grower's logo, the contents of a container, etc., can be included on the band of material at appropriate locations. The location for the band itself is set. The side and end wall structures define a path for the same. This band also is most desirably made of a recyclable material. In this connection, it will be recognized that with reuse of the container (but not the band for each container) there will be many bands which can be shredded and recycled. The band also most desirably is of the same material as the remainder of the container, e.g., polypropylene.

Each of the end walls includes a relatively rigid frame 19. It is the frames 19 of each container which are the main structural members which take the load when the containers are stacked. While each of the end walls is most desirably made from the same plastic material as the bottom and side wall structures of the container, each end frame is an injected molded, structural foam part. In this connection, appropriate energy directors are provided in its design to facilitate welding.

Each end frame is positioned against a surface of the end wall of which it is a part as shown in FIG. 3 for connection thereto. In one implementation this connection was via vibration welding.

The side edges of each frame include posts 20–23 that are relieved for the band and thus define the basic vertical positioning of such band relative to the wall structures. Each end frame also has a pair of pins 24 and 26 which register with apertures in the band to hold the same generally in position.

It will be appreciated that although it is the side and end wall structures which actually engage the contents of the container, the band 18 adds structural integrity to hold the wall structures together with the bottom wall to form a container cavity. It should be noted that from the broad standpoint one need not provide a band—an exterior wrapping of strong tape will provide the same structural integrity. Moreover, the band and the remainder of the container can be manufactured at separate locations, even by different parties.

The container includes in addition to the band 18, connecting structure for securing the end and side walls together. The side walls have flaps 29–33 which when the container is assembled with the walls adjacent one another, extend between the frame 19 of each end wall and a plastic filler panel 34 of the end wall (see FIGS. 5 and 6A). In this connection, each frame 19 includes not only the end posts and horizontally connecting members as illustrated, but also a pair of plates 36 and 37. Each end flap 29–33 includes a slot 38 which when the side and end walls are assembled as discussed is engaged by a projecting tab/hooking device 39 on the interior side of each of the respective plates 36 and 37.

Each of the plastic filler panels 34 is slotted adjacent the projection as illustrated at 40. The slots 40 enable that portion of the plastic filler panel between the same to bow under pressure, as is illustrated in FIG. 6B. This bowing facilitates removal of the projection 39 from its associated slot when the side walls are to be disengaged from the end walls.

It will be seen from the above that complementary interlocking constructions are provided on the adjacent edges of the wall structures. In the preferred container being described, the purpose of the interlocking constructions simply is to enable erection of the container and securance of the side walls together before the band 18 is installed. It is the band which provides the structural integrity that is necessary for the container to contain commodities. It will be recognized, though, that depending upon the commodity such a band or an alternative for it may not be necessary. Moreover, in other containers the complementary interlocking constructions may be made sufficiently strong to provide the desired structural integrity by themselves.

The above construction facilitates the opening of a side to enable the contents of the container to be seen or to facilitate physical access to such contents. In this connection, means are provided for securing a side wall in a position away from the other of the wall structures and bottom wall making up the container. This is illustrated in FIG. 5. After the band 18 is removed, one of the side walls can be tipped out simply by releasing the detent 39 from the slot 38 in each of the side walls. Means including hole 41 is also provided in each of the flaps 32 to hold the flaps in an extended, but limited, position. The hole 41 in a flap is brought into registration with a hole 42 in its associated end frame plate so that a dowel or pin can be used for securing a side wall in its desired position.

As a major feature, the container is changeable from a position in which the wall structures define a container as described above to a flat condition in which such wall structures are in generally the same plane as the bottom (see FIG. 2). This aids significantly in the reusability of the container. That is, after use it is only necessary to remove the band by cutting or the like, and then place the container in a flat condition. plurality of the flattened containers then can be palletized, shipped and cleaned. In this connection, as illustrated in FIG. 3 protruding lips 42 and tits 43 of one flattened container protrude into its neighbor to aid in positioning containers relative to one another. These tits and lips define a pathway for a lid as will be described when the containers are erected and, thus, have a dual function.

The invention includes the method of washing and sterilizing the containers for reuse while they are still in their flattened condition. As mentioned previously, the plastic material selected for the containers (and for the band) is nonabsorbent. This simplifies the nature of the washing and sterilizing equipment that is necessary. In this connection, it enables easy access to all parts of the container with a brush. Vertically adjacent containers in a stack can be separated to enable a brush to pass therebetween and then the containers passed by appropriate brushes on a continuous conveyor or the like.

Once the containers are washed and sterilized, flattened pallet containers then can be palletized and shipped to a packer, grower or other user for reuse. The ratio of volume used by a flattened palleted container relative to an erected container is approximately 1:8. When the containers are at a packer/grower site, they can be erected. In one implementation, it takes approximately 3–5 seconds to erect the containers by hand. Machinery can be provided to do so, though, in between 1 and 2 seconds. The band also is applied before a container is reused. In a specific implementation matching the container embodiment being described, application of the band by hand is accomplished within about 3–5 seconds. It can be installed by relatively simple and inexpensive machinery in between 1 and 2 seconds.

Each container includes connector structure for securing the container to a generally vertically adjacent container. The connector structure in the particular implementation to be described is designed to provide connection to facilitate handling when the containers are empty or quite light. It is recognized, though, that more structurally strong connector arrangements can be used if desired to enable the containers to be secured together even when relatively heavy. Each of the posts of the end frames includes a dovetail slot at its top surface to capture a clip for such securance. FIG. 9 illustrates the manner in which adjacent containers are stacked on one another, whereas FIGS. 10A and 10B provide details of the construction. Each post, represented by the post 20 in the figures, includes a dovetail slot 46. (It should be mentioned that the views in FIGS. 10A and 10B are the back side of the end frame posts and molding details forming no part of the invention as described are shown.) A clip 47 is provided configured to be captured by the dovetail slot as illustrated. As shown in the drawings, such dovetail slot has opposing walls which define an opening for the clip, which walls are configured relative to the clip to obstruct removal of the clip through such opening. The clip, however, can be slid into the dovetail slot from the end of the same. The upper portion of the clip is defined by a pair of prongs 48 which resiliently can enter and be captured within a complementary dovetail slot 49 on the adjacent upper container. These clips are also most desirably of the same material as the remainder of the container.

FIGS. 11A and 11B illustrate alternate lids for the container. The lid 51 of FIG. 11A includes a pair of edges 52 and 53 which are shaped to capture the upper edge of the container side walls when installed so as to provide additional structural support to the side walls. The lid 54 of FIG. 11B is designed not to extend all the way to the side walls but rather leave a meaningful gap to permit significant air access to a product within the container, as well as "visual access" as is appropriate. This lid is the one shown in the other figures and includes, as is indicated on two opposed end edges, a pair of tabs 56 which register with and fit within corresponding slots 57 defined by the end frame members 19. The lip 42 and the tits 43 on each end define a guide path for the end edges of the lids.

As mentioned at the beginning of the detailed description, protection is not necessarily limited to the specific embodiment described above. Various changes and modifications can be made. The claims, their equivalents and their equivalent language define the scope of protection.

What is claimed is:

1. A method of cleaning a reusable plastic container for commodities, which container has (1) a bottom wall defining a plane and having at least two pairs of opposing edges; (2) a pair of end wall structures, each of which projects in a direction from an associated edge of one of said pair of opposed edges of the bottom wall essentially in the same direction relative to said bottom wall as the other one of said end wall structures; (3) a pair of side wall structures, each of which projects in a direction from an associated edge of the other one of said pair of opposed edges of said bottom wall essentially in the same direction relative to said bottom wall as said end wall structures; and (4) hinge means made of plastic connecting each of said wall structures to its associated bottom edge permitting said wall structure to be moved between a position defining with said wall structures and said bottom wall a container cavity for a commodity, and a flattened position in which said wall structure is adjacent to and essentially parallel to the plane of said bottom wall when said container is flat; said method comprising the steps of:

(a) flattening said container after use of such container to hold a commodity by moving each of said end wall structures to said position in which it is adjacent to and essentially parallel to said plane of said bottom wall;

(b) stacking a plurality of flattened plastic containers; and (c) cleaning said plurality of reusable plastic containers while said containers are in flattened condition.

2. The method of claim 1 further including the step after said reusable plastic containers are cleaned of moving each of said wall structures to said position defining a container cavity with said wall structures and said bottom wall.

\* \* \* \* \*